June 4, 1940.   O. GEISLER   2,203,328
MANUFACTURING SELENIUM VALVE DISKS FOR RECTIFIERS AND PHOTOELECTRIC CELLS
Filed Aug. 2, 1939
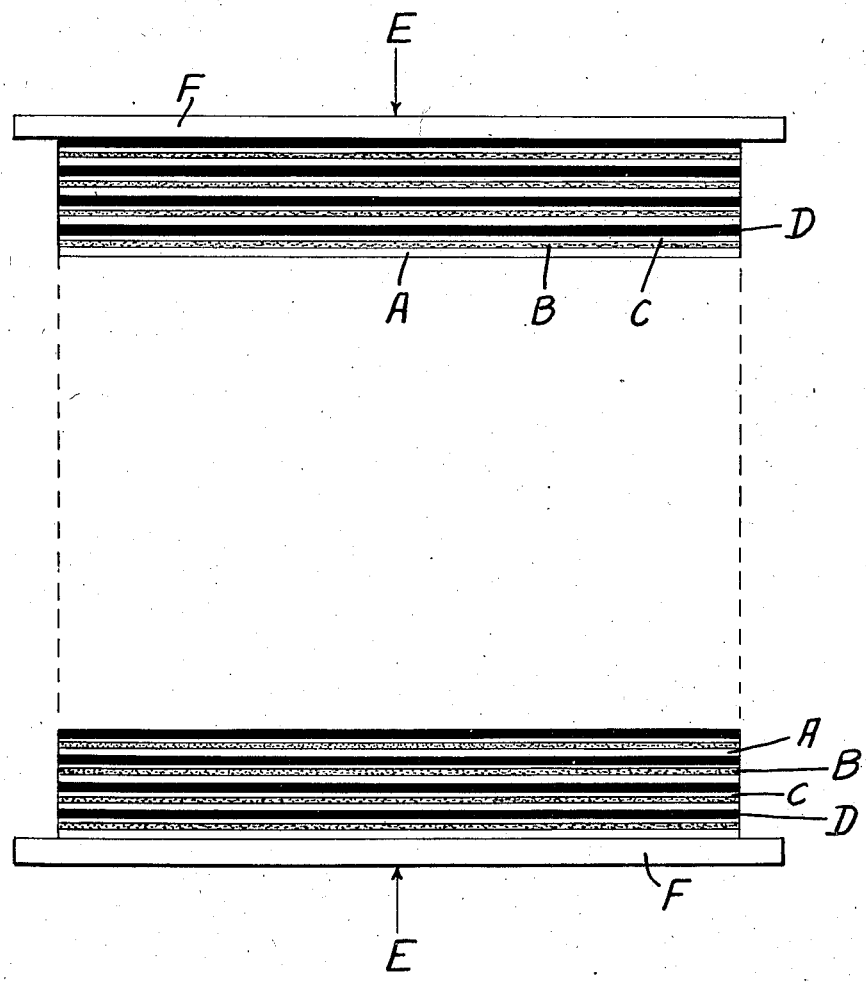
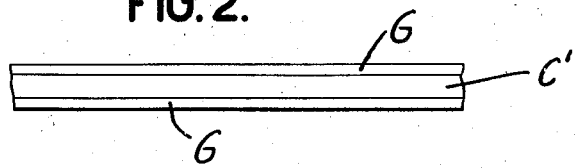
INVENTOR
OTMAR GEISLER
BY
ATTORNEY Patented June 4, 1940

2,203,328

UNITED STATES PATENT OFFICE 2,203,328

MANUFACTURING SELENIUM VALVE DISKS FOR RECTIFIERS AND PHOTOELECTRIC CELLS

Otmar Geisler, Nuremberg, Germany, assignor to Suddeutsche Apparate-Fabrik G. m. b. H., Nuremberg, Germany, a company Application August 2, 1939, Serial No. 287,895
In Germany August 6, 1938

3 Claims. (Cl. 175—366)

In the manufacture of selenium rectifiers or photoelectric selenium cells the valve disks, which consist of a metal of the iron group as the base plate and an amorphous selenium layer melted onto this base plate, are subjected to a thermal formation process by which the selenium layer is converted into the grey-crystalline modification possessed of good electric conductivity.

The invention relates to formation processes of this kind and is explained hereafter by way of example.

Fig. 1 is a diagrammatic view showing a known arrangement that serves for forming valve disks of the said kind. Fig. 2, drawn to a larger scale than Fig. 1, is a fragmentary view of auxiliary disks suitable for effecting the novel method. For the sake of clearness the thickness of the several disks and layers is drawn to a much enlarged scale.

As shown in Fig. 1 the selenium valve disks comprise a base plate A and a selenium layer B which is amorphous before having undergone the aforesaid formation process. In accordance with the known arrangement that serves for the formation process the selenium valve disks are stacked with the insertion of thin disks C made of mica, glass, hardened steel or nickel. Rubber disks D are inserted between the disks C and A. As indicated by the arrows E, the pile so obtained is compressed and subjected to the formation temperature. F denotes pressure plates.

During this formation aided by the application of pressure, the thin flexible auxiliary disks C, made of mica or metal, cause the elastic pressure from the rubber disks D to be equably transferred to the selenium layers B, whereby these are equably distributed on the plates A. The disks C also prevent the selenium layers and rubber disks from contacting with one another. Otherwise, the selenium, being of high chemical activity especially when in its hot condition, would be affected by the rubber disks.

Among the known disks C only those made of mica have proved to be suitable, because none but mica discs are possessed of the requisite flexibility while being perfectly neutral as regards the selenium layer.

After the formation process the mica disks C may be easily moved from the compressed selenium layers B, these having become completely solid in accordance with the crystallization progressing.

On account of the comparatively high cost of mica disks, especially with valves of larger diameter, it is customary to use the mica disks several times. Since, however, the thin mica disks are liable to break, particularly as they are cleaned before using them afresh, they cannot be used as often as may be desirable.

In accordance with the invention, instead of the disks C made of mica or another of the said materials, metal foils C', Fig. 2, are employed which are coated with a protective layer G neutral with respect to the selenium layer.

For instance, oxidized aluminium foils are suitable. For the production of such aluminium foils the methods known as band formation process are particularly well adapted. From the formed aluminium tapes disks of the desired size are produced by punching. In this way disks are obtained which, owing to their cheapness, will be used only once, thus doing away with any cleaning.

Furthermore, the invention may be effected with the aid of suitable metal foils made of brass or aluminium, for instance, and coated with a suitable artificial resin made firmly to adhere to the foil. Such resin remains perfectly neutral with respect to the selenium layer even under the influence of the formation temperatures, that is, from 100 to 150 degrees centigrade, and hence will in no wise be affected by the selenium. Metal foils coated with artificial resin as protective layer present the advantage that this layer need not be obtained by a formation process of the kind necessary for producing the protective layer in the case of aluminium foils.

What is claimed is:

1. In the manufacture of selenium valve disks for rectifiers and photoelectric cells the method which consists in stacking valve disks, composed of a metallic base plate and an amorphous selenium layer thereon, and auxiliary disks between these valve disks, such auxiliary disks being composed of a metal foil and a protective layer on this, and which further consists in compressing the pile of disks so obtained while heating it until the amorphous selenium has been converted into the crystalline modification.

2. A method as defined in claim 1 in which the said metal foil is of aluminium, while its protective layer is aluminium oxide.

3. A method as defined in claim 1, in which the said protective layer is an artificial resin.

OTMAR GEISLER.